Figure 1:
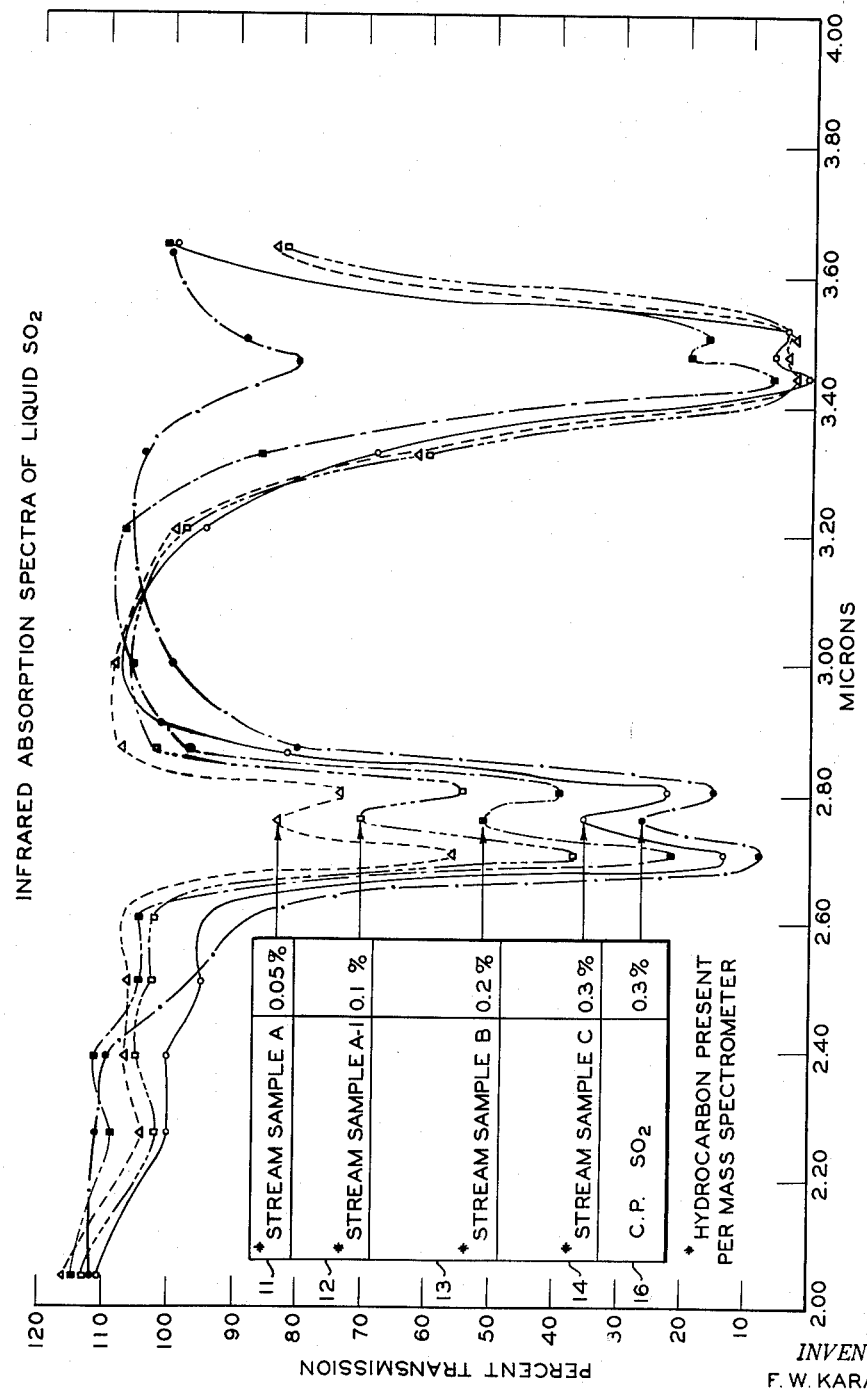

Aug. 26, 1958     F. W. KARASEK     2,849,617
WATER DETECTION IN SULPHUR DIOXIDE BY AN
INFRA-RED ANALYZER

Filed May 25, 1953     2 Sheets—Sheet 1

INVENTOR.
F. W. KARASEK

BY *Hudson & Young*

ATTORNEYS

INVENTOR.
F. W. KARASEK
BY Hudson and Young,
ATTORNEYS

United States Patent Office 2,849,617
Patented Aug. 26, 1958

2,849,617
WATER DETECTION IN SULPHUR DIOXIDE BY AN INFRA-RED ANALYZER

Francis W. Karasek, Dewey, Okla., assignor to Phillips Petroleum Company, a corporation of Delaware Application May 25, 1953, Serial No. 357,143

8 Claims. (Cl. 250—43.5)

This invention relates to the detection of water in sulphur dioxide. In one of its specific aspects, this invention relates to a method for the detection of water in liquid sulphur dioxide. In another of its specific aspects, this invention relates to a means for detection of water in liquid sulphur dioxide utilizing an infra-red analyzer.

Because of the corrosive effects of water accumulation in sulphur dioxide, an accurate and readily available determination of such water content is often desirable. Specifically, in the solvent extraction of hydrocarbons utilizing sulphur dioxide and in processes for the separation of sulphur dioxide from water, it becomes extremely important to be able to measure, record and control the water content of a sulphur dioxide stream. The conventional methods for making such a determination are difficult and time consuming and especially unsuitable when applied to continuous hydrocarbon processes.

The objects of this invention will be attained by the various aspects of the invention.

It is an object of this invention to provide a method for the detection of water in sulphur dioxide.

It is also an object of this invention to provide a means for the detection of water in liquid sulphur dioxide, utilizing an infra-red analyzer.

It is a further object of this invention to provide a means for the detection of water in liquid sulphur dioxide, which may also contain some hydrocarbon material, utilizing an infra-red analyzer.

It is a still further object of this invention to provide a method for measuring the water content of a sulphur dioxide stream which may also contain hydrocarbon material.

It is still another object of this invention to provide a simple, accurate and economical method and means for determining the water content of a liquid, such as sulphur dioxide, which may also contain hydrocarbon material.

Various other objects, advantages and features of the invention will become apparent from the accompanying disclosure.

It has been generally believed that infra-red analysis methods could not be employed for the determination of the water content of liquid streams containing hydrocarbons. This belief has been based upon the assumption that compounds containing hydrogen would interfere so appreciably in the 2.5 to 3.0 micron region that this method of analysis would be impracticable. I have discovered, however, that for sulphur dioxide streams containing hydrocarbon material and water in small concentrations, the water and hydrocarbons occupy separate and distinct absorption bands in the region between 2.0 and 4.0 microns. This phenomenon is particularly evident where small concentrations of the two materials are present and where in the conventional analysis methods, accurate determination of water content becomes most difficult and time-consuming. By taking advantage of the fact that infra-red absorption for water and hydrocarbons is a maximum at different wave lengths, in accordance with this invention, it is possible to determine the water content of a liquid even in the presence of hydrocarbons.

Figure 2:
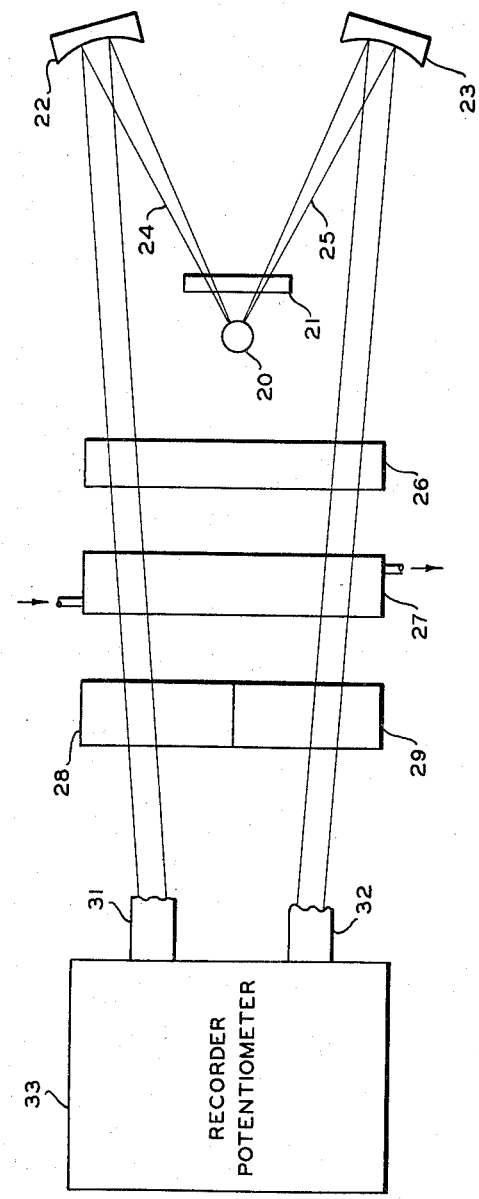

For a better understanding of the invention, reference should be had to the accompanying drawing and descriptive matter, in which:

Figure 1 illustrates graphically the infra-red absorption spectra of liquid sulphur dioxide, containing varying amounts of water and hydrocarbon, and Figure 2 is a schematic view of the optical assembly of an infra-red analyzer.

Referring to Figure 1 of the drawing, there are illustrated the infra-red spectra of liquid sulphur dioxide containing varying amounts of water and hydrocarbons in small concentrations. Curves 11, 12, 13, and 14 represent spectra when the water content of the sulphur dioxide is 0.05, 0.1, 0.2, and 0.3 mol percent, respectively. Curve 16 represents the spectrum of liquid sulphur dioxide containing 0.3 mol percent water, but free of any hydrocarbons. The spectra illustrated by curves 11, 12, 13, and 14 indicate that the water and hydrocarbons occupy distinct and separate absorption bands at approximately 2.70–2.80 microns and 3.40–3.60 microns, respectively. That the absorption band at 3.40–3.60 microns is due to hydrocarbons is substantiated by curve 16 which illustrates the spectrum of chemically pure liquid sulphur dioxide containing 0.3 mol percent water. This spectrum does not have the 3.40–3.60 micron absorption band as do the spectra of sulphur dioxide which contain hydrocarbons. That the absorption bands at 2.70–2.80 microns are due to water is shown by their changes in intensity with variations in water content. It is thus apparent that the water bands are well separated from interfering bands and that by comparing the energy absorption in the 2.70–2.80 micron region of a sample of liquid sulphur dioxide containing water with the energy absorption of a standard sample at the same wave length, it is possible to determine the water content of the sample. In making this determination, an infra-red analyzer as described below can be used.

Referring now to Figure 2 of the drawing, there is shown a source 20 of infra-red radiation from which two beams are directed through a window 21 against a pair of front surface concave mirrors 22 and 23. The respective beams of radiation, namely, reference beam 24 and sensitive beam 25, are reflected by the mirrors and thence pass through cell 26, cell 27, and a pair of cells 28 and 29 to a pair of radiation-sensitive devices 31 and 32, such as bolometers, thermo-couples, or thermistors. The cells are provided with windows which are made of a transparent material which does not absorb infra-red radiation of wave lengths from about 2.40 to about 3.60 microns. While certain glasses can be used, it is preferred to utilize windows formed of quartz. Bolometers 31 and 32 are connected to recorder-potentiometer 33 which may be of a type well-known in the art and which is capable of indicating and recording the differential in radiant energy of the beams incident upon bolometers 31 and 32. A recorder-potentiometer similar to that disclosed in U. S. Patent 2,579,825 may be advantageously used with this invention.

In the operation of the analyzer of Figure 2, the sulphur dioxide stream whose water content is to be determined is passed continuously through sample cell 27. The transparent windows of the cells should each be about 2 mm. thick, and, assuming that quartz is being used, they will exclude radiation above about 4.5 microns. Filter cell 28 in reference beam 24 is filled with a material which will absorb radiation having wave lengths longer than about 2.5 microns so as to sensitize beam 25 to the 2.70 to 2.80 micron water absorption band. Liquid sulphur dioxide containing a known amount of water depending upon the desired sensitivity of the analysis can be used in cell 28. For example, if the analysis of sulphur dioxide streams having a water content up to 2 mol percent is contemplated, cell 28 will be filled with sulphur dioxide having a water content of 2 mol percent. Cell 29 is allowed to remain empty, and has no effect on the beam passing therethrough. Interference cell 26 is filled with a material which will absorb from both beams radiation having wave lengths longer than about 3.2 microns so as to desensitize the analyzer to variations in the hydrocarbon content of the sulphur dioxide stream. A hydrocarbon gas, which will absorb radiation at about 3.40 to 3.60, can be used in cell 26. It is to be understood that any type of sensitizing or interference filter can be utilized with the analyzer as long as the filter absorbs infra-red radiation in the wave length regions as indicated. Thus, solid filters can be used to replace the gaseous and liquid materials as described above, in which case a sensitizing filter of high-silica glass such as that manufactured by the Corning Glass Works under the trademark Vycor glass and an interference filter of polyethylene will replace cells 28 and 26, respectively.

Beams 24 and 25 in passing through sample cell 27 both lose a certain amount of energy by absorption in the 2.70–2.80 micron region because of the presence of water in the sulphur dioxide stream. The amount of energy actually lost will depend on the percent of water contained in the sample stream. Beam 24 in passing through filter cell 28 loses energy at wavelengths of about 2.70–2.80 microns in an amount dependent upon the standard sample being used. As indicated above, the water content of the standard sample is known and is based upon the sensitivity which it is desired that the instrument have. Beam 25 in passing through cell 29 loses no energy in the 2.70–2.80 micron region.

The beams after passage through the cells, as indicated, contain different total energies, such difference representing the radiation in the 2.70–2.80 micron region which was not absorbed when beam 25 passed through sample cell 27. The beams of radiation on being detected by bolometers 31 and 32 produce temperature changes therein, which in turn, vary the electrical resistances of the bolometers. With the arrangement of apparatus as described, the differential in resistance between the bolometers indicates the amount or percentage of the water contained in the liquid sulphur dioxide sample. The bolometers may be connected in a circuit similar to that described in U. S. Patent 2,579,825, in which event a continuous record of the water content of the sample is provided.

While this invention has been described with a certain degree of particularity, it is within the contemplation of the invention to utilize any conventional infra-red analyzer. The analyzer may be set up so that one bolometer has a filter to exclude radiation longer than 3.2 microns while the other bolometer has a filter to exclude radiation longer than 2.5 microns with the sample being in both beams. The analyzer may also be set up so that the sample is in one beam, and a hydrocarbon filter is in both beams.

In the practice of this invention, the sulphur dioxide is to be handled as a liquid which will necessitate a pressure cell with a short path length, as for example, 1 millimeter. It is, however, within the contemplation of this invention to employ a longer path cell in which case the overtone bands of water in the 1–2 micron region may be used.

As will be evident to those skilled in the art, various modifications of the invention can be made or followed in the light of the foregoing disclosure and discussion without departing from the spirit or scope of the disclosure.

I claim:

1. A method for determining the water content of a liquid sulphur dioxide stream containing not more than a small noninterfering concentration of hydrocarbon material which comprises the steps of passing a beam of infra-red radiation through a sample of said stream; measuring the energy absorbed by said sample at wave lengths in the region of 2.7–2.8 microns; and comparing the energy absorption of said sample with the energy absorption of a standard sample of sulphur dioxide of known water content at said wave lengths.

2. A method for determining the water content of a liquid sulphur dioxide stream containing hydrocarbon material in small noninterfering concentrations which comprises the steps of passing a first beam of radiation from an infra-red source through a cell containing a sample of said stream; passing a second beam of radiation from said source through a cell containing a standard sample of sulphur dioxide of known water content; and detecting the differential in beam energies between said first and second beams by utilizing radiation-sensitive devices.

3. A method for determining the water content of a liquid sulphur dioxide stream containing hydrocarbon material in small noninterfering concentrations using an infra-red analyzer which comprises the steps of determining the amount of transmission of infra-red radiation through a sample of said stream at wave lengths in the region of 2.7–2.8 microns and comparing said amount with the amount of transmission of infra-red radiation through a standard sample of liquid sulphur dioxide of known water content at wave lengths in the region of 2.7–2.8 microns.

4. A method for determining the water content of liquid sulphur dioxide containing hydrocarbon material in small noninterfering concentrations using an infra-red analyzer which comprises the steps of filtering a first beam of infra-red radiation so as to absorb radiation in excess of about 2.5 microns; filtering a second beam of infra-red radiation so as to absorb radiation in excess of about 3.2 microns; passing said second beam through a sample of said liquid sulphur dioxide; and detecting the differential in beam energies between said first and second beam by using radiation-sensitive devices.

5. A method for determining the water content of liquid sulphur dioxide containing hydrocarbon material in small noninterfering concentrations, using an infra-red analyzer which comprises the steps of filtering a first beam of infra-red radiation so as to absorb radiation having wave lengths in excess of about 2.5 microns; filtering a second beam of infra-red radiation so as to absorb radiation having wave lengths in excess of about 3.2 microns, passing said second beam through a sample of said liquid sulphur dioxide; detecting the differential in resistance between a pair of radiation-sensitive devices caused by the incidence of said first beam upon one of said devices and of said second beam upon the other of said devices; and recording said differential in resistance so as to indicate the water content of said sample.

6. A method for determining the water content of a liquid sulphur dioxide stream containing hydrocarbon material in small noninterfering concentrations using an infra-red analyzer which comprises the steps of passing a first and second beam of radiation from an infra-red source through an interference cell containing a hydrocarbon gas; thereafter passing said first and second beams through a sample cell containing a sample of said stream; directing said first beam through a standard sample cell containing liquid sulphur dioxide of known water content; and detecting the differential in beam energies between said first and second beams by utilizing radiation-sensitive devices.

7. A method for determining the water content of a liquid sulphur dioxide stream containing hydrocarbon material in small noninterfering concentrations, which comprises the steps of passing a first and second beam of radiation from an infra-red source through a filter so as to eliminate radiation having wave lengths in the range of about 3.4 to 3.6 microns; thereafter passing said first and second beams through a sample of said sulphur dioxide stream; directing said first beam through a filter so as to eliminate radiation having wave lengths in the range of about 2.7 to 2.8 microns; and detecting the differential in beam energies between said first and second beams by utilizing radiation-sensitive devices.

8. A method of determining the water content of a liquid sulphur dioxide stream containing hydrocarbon material in small noninterfering concentrations using an infra-red analyzer which comprises the steps of passing a first and a second beam of infra-red radiation through an interference filter of polyethylene; thereafter passing said first and second beams through a sample cell containing a sample of said stream; directing said first beam through a sensitizing filter of high-silica glass; and detecting the differential in beam energies between said first and second beam by utilizing radiation-sensitive devices.

References Cited in the file of this patent

UNITED STATES PATENTS

| | | |
|---|---|---|
| 2,431,019 | Barnes | Nov. 18, 1947 |
| 2,518,307 | Groebe | Aug. 8, 1950 |
| 2,570,064 | Meinert | Oct. 2, 1951 |
| 2,621,297 | Obermaier | Dec. 9, 1952 |
| 2,703,844 | Miller | Mar. 8, 1955 |

OTHER REFERENCES

"Selective Infra-Red Analyzers," Fastie et al. Journal of the Optical Soc. of America, volume 37, #10, October 1947, pp. 762–8.

"Rev. of Scientific Instruments," March 1948, pp. 176–8.

Recording Infra-Red Analyzers for Butadiene and Styrene Plant Streams, Wright et al., Journal of the Optical Society of America, volume 36, #4, April 1946, pp. 195–202.